(12) United States Patent
Iwaya et al.

(10) Patent No.: US 11,128,190 B2
(45) Date of Patent: Sep. 21, 2021

(54) ROTARY MACHINE COIL USING A WINDING ELECTRIC WIRE

(71) Applicant: MEIKO ELECTRONICS CO., LTD., Kanagawa (JP)

(72) Inventors: Kimiaki Iwaya, Asahikawa (JP); Yuki Kaketa, Asahikawa (JP)

(73) Assignee: MEIKO ELECTRONICS CO., LTD., Kanagawa (JP)

(*) Notice: Subject to any disclaimer, the term of this patent is extended or adjusted under 35 U.S.C. 154(b) by 155 days.

(21) Appl. No.: 16/463,264

(22) PCT Filed: Nov. 30, 2017

(86) PCT No.: PCT/JP2017/042953
§ 371 (c)(1),
(2) Date: May 22, 2019

(87) PCT Pub. No.: WO2018/101378
PCT Pub. Date: Jun. 7, 2018

(65) Prior Publication Data
US 2019/0296596 A1     Sep. 26, 2019

(30) Foreign Application Priority Data

Nov. 30, 2016  (JP) .............................. JP2016-233028

(51) Int. Cl.
*H02K 3/28*     (2006.01)
*H02K 1/12*     (2006.01)
(Continued)

(52) U.S. Cl.
CPC ................ *H02K 3/28* (2013.01); *H01B 7/00* (2013.01); *H01F 5/00* (2013.01); *H01F 27/28* (2013.01);
(Continued)

(58) Field of Classification Search
CPC .. H01B 7/00; H01F 27/28; H01F 5/00; H02K 15/04; H02K 15/0435; H02K 1/12; H02K 21/24; H02K 3/04; H02K 3/28
See application file for complete search history.

(56) References Cited

U.S. PATENT DOCUMENTS 5,744,896 A * 4/1998 Kessinger, Jr. .......... H02K 3/04
                                                    310/198
2006/0181238 A1* 8/2006 Choi ....................... H02P 25/04
                                                    318/786
(Continued)

FOREIGN PATENT DOCUMENTS

CN        S62-234805 A    10/1987
CN        1366314 A        8/2002
(Continued)

OTHER PUBLICATIONS

International Search Report for corresponding PCT application No. PCT/JP2017/042953, dated Jan. 23, 2018.
(Continued)

*Primary Examiner* — Timothy J Thompson
*Assistant Examiner* — Rhadames Alonzo Miller
(74) *Attorney, Agent, or Firm* — Notaro, Michalos & Zaccaria P.C.

(57) ABSTRACT

A winding electric wire enables a space factor to be increased and an eddy current to be suppressed, despite using an easy winding process. A winding electric wire is configured such that one enameled wire or a plurality of enameled wires bundled in parallel or in a litz form are braided so as to be formed into a belt-like rectangular or square wire shape having flat braided wires forming flatly-molded layers the number that is two or a multiple of two.

5 Claims, 11 Drawing Sheets

(51) Int. Cl.
  *H02K 15/04* (2006.01)
  *H01F 5/00* (2006.01)
  *H02K 3/04* (2006.01)
  *H01F 27/28* (2006.01)
  *H01B 7/00* (2006.01)
(52) U.S. Cl.
  CPC ............. *H02K 1/12* (2013.01); *H02K 3/04* (2013.01); *H02K 15/04* (2013.01); *H02K 15/0435* (2013.01)

(56) References Cited

U.S. PATENT DOCUMENTS

| 2008/0315705 | A1* | 12/2008 | Obata | B60L 15/007 |
| | | | | 310/198 |
| 2016/0181882 | A1* | 6/2016 | Iwaki | H02K 3/345 |
| | | | | 310/215 |
| 2016/0261159 | A1* | 9/2016 | Tsuiki | H02K 3/28 |
| 2017/0117768 | A1* | 4/2017 | Nakamura | H02K 15/024 |

FOREIGN PATENT DOCUMENTS

| CN | 101657951 | A | | 2/2010 |
|---|---|---|---|---|
| CN | 102077430 | A | | 5/2011 |
| CN | 102668332 | A | | 9/2012 |
| CN | 104465034 | A | | 3/2015 |
| EP | 1691479 | A1 | | 8/2006 |
| JP | H08-126275 | A | | 5/1996 |
| JP | H08126275 | A | | 5/1996 |
| JP | H10-233128 | A | | 9/1998 |
| JP | 2002358840 | A | * | 12/2002 |
| JP | 3481890 | B2 | | 12/2003 |
| JP | 2010-62481 | A | | 3/2010 |
| JP | 2010062481 | A | | 3/2010 |
| JP | 2010062481 | A | * | 3/2010 |
| JP | 2014-166102 | A | | 9/2014 |
| JP | 2014166102 | A | | 9/2014 |
| JP | 2016-31963 | A | | 3/2016 |
| JP | 2016031963 | A | | 3/2016 |
| TW | 200849289 | A | | 12/2008 |

OTHER PUBLICATIONS

Yamamoto, Yuta, et al., "High Torque Density Design of a Direct Driven Synchronous Motor Using Flat-type Armature Windings", The Institute of Electrical Engineers of Japan, National Convention Proceedings in 2013, Dissertation No. 5-036, Mar. 5, 2013, pp. 64-65.

International Preliminary Report on Patentability for corresponding PCT application No. PCT/JP2017/042953, dated Jun. 4, 2019.

European Supplementary Search Report for corresponding European patent application No. EP17875577, completed May 27, 2020.

Chinese/Korean Office action issued in foreign counterpart application No. 2017800737397.

* cited by examiner

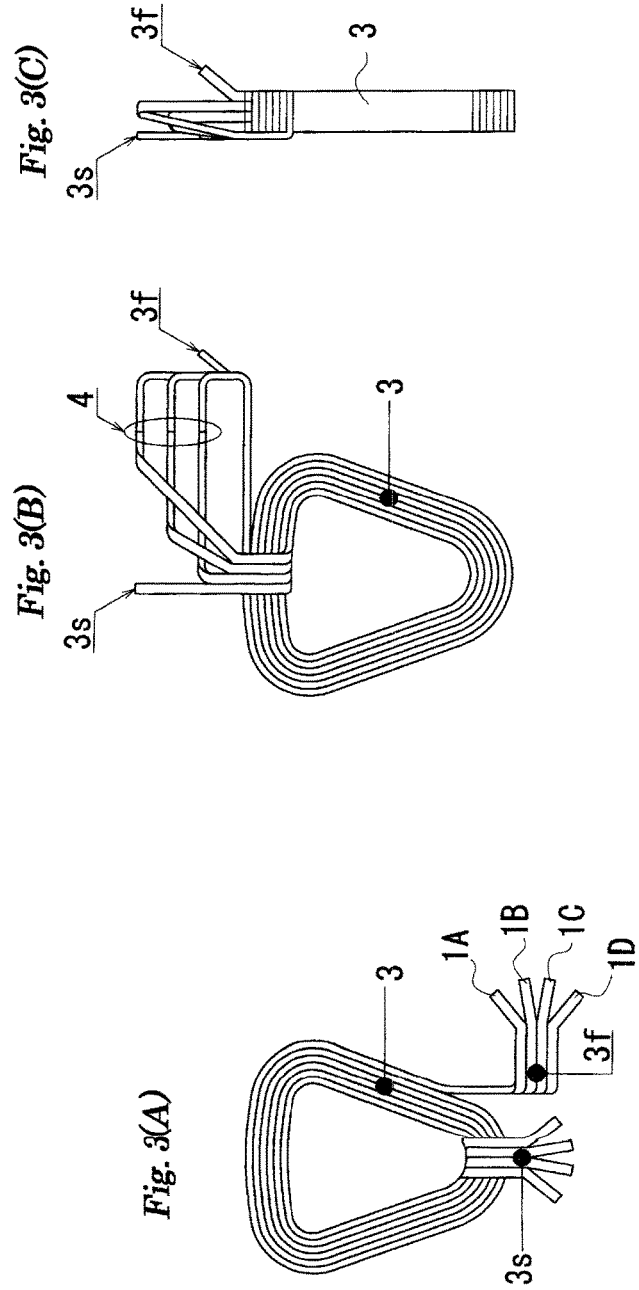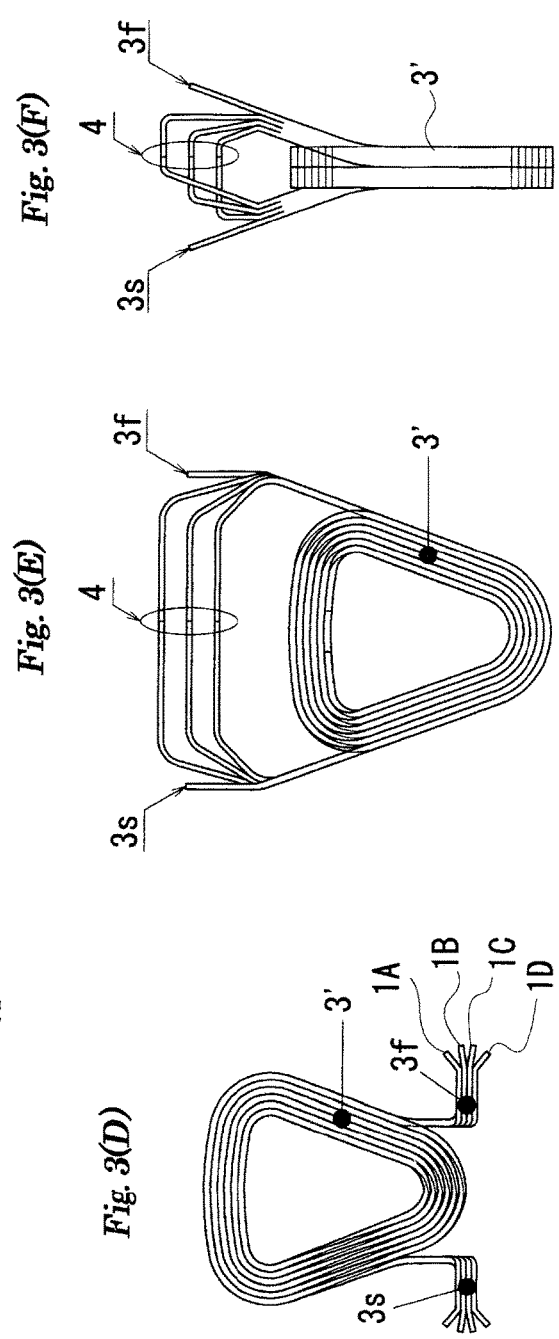

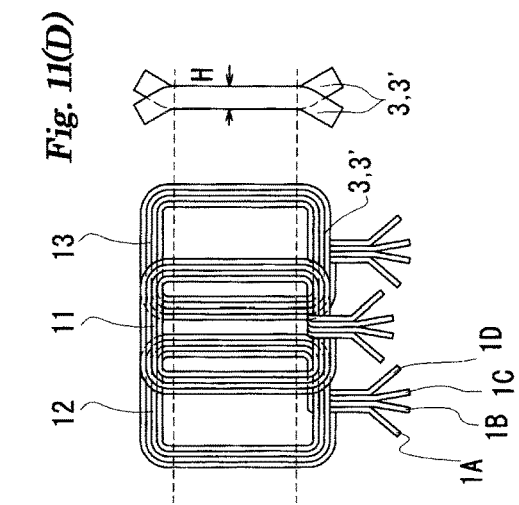
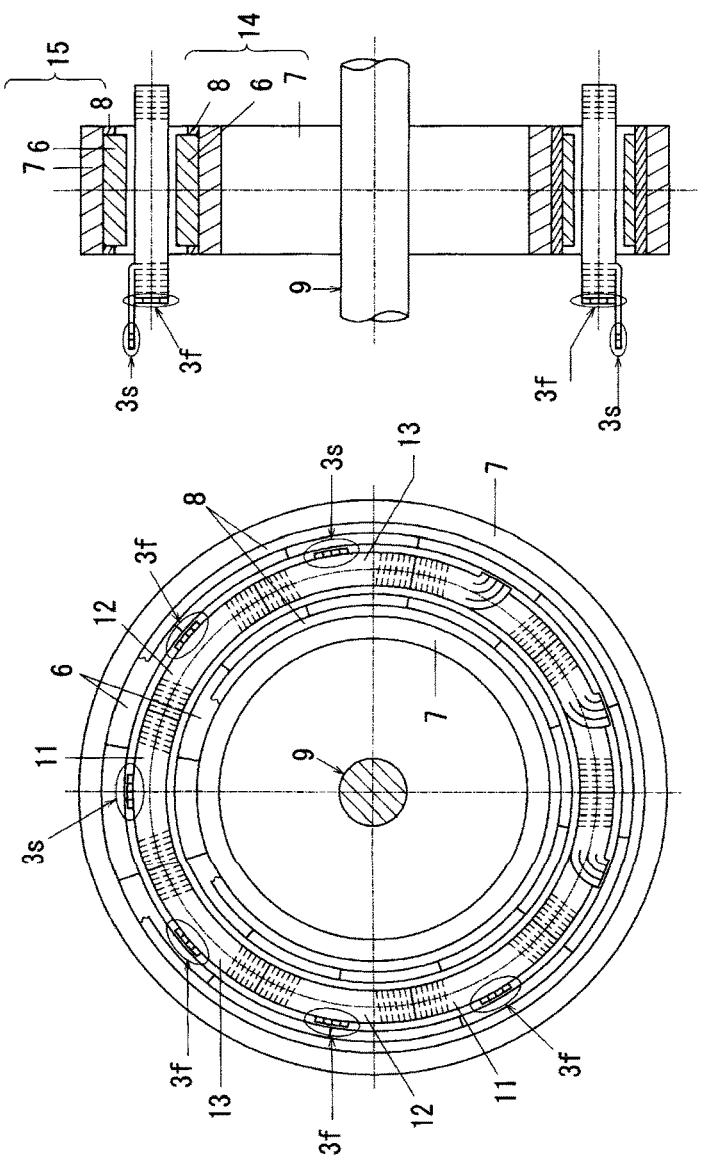

ROTARY MACHINE COIL USING A WINDING ELECTRIC WIRE

TECHNICAL FIELD

The present invention relates to an electric wire for winding, a coil for a rotating machine using the same, and a method of manufacturing the electric wire for winding.

BACKGROUND ART

Conventionally, in order to improve the performance of a rotating machine including a motor and a generator, it is required to increase a space factor of a coil. As the space factor increases, ampere-turn per unit cross-sectional area can be increased, such that the performance as a winding can be enhanced.

As a rotating machine for increasing the space factor, for example, a print motor using a disk-like armature is known. The print motor forms a coil by etching a copper foil on an insulated resin plate. However, there is a limit to an etching-type coil even if the thickness of copper is increased by piling up plating. Therefore, there is a limit to increasing of motor output.

On the other hand, in the case of a normal rotating machine using a coil wound with an electric wire for winding, if the electric wire for winding is thickened, the output can be easily increased, but there is a problem that a space factor is decreased. Here, since a square wire whose conductor has a square shape or a flat wire whose conductor shape is a band shape, which is manufactured by rolling a round wire, has a space factor of 20% to 30% higher than that of a round wire, such that a resistance value can be made lower than in the case of a coil composed of round wires having the same size, and since there is also an effect of improving heat radiation by surface contact, it is possible to flow much more current. Furthermore, in the case of a square wire or a flat wire, it is possible to increase the number of turns, and it is considered that there is an effect of downsizing the coil as compared with a coil with the same performance (resistance value, number of turns). Therefore, a motor using a flat wire coil with a high space factor, which is expected to reduce the size and improve the performance of a coil, has been proposed (Non-Patent Literature 1, Patent Literature 1).

Furthermore, in the case of a rotating machine in which an electric wire for winding is wound around a core to form a coil, the output can be easily increased by thickening the electric wire for winding. However, if the core is small, it becomes difficult to bend the electric wire for winding, and the coil is not easily wound. Consequently, it makes difficult to miniaturize a motor. In the case where the core is small, a flexible electric wire for winding is needed to make it easier to wind the electric wire for winding. Therefore, a litz wire that is made flexible by twisting a large number of thin round wires together is used (Patent Literature 2).

CITATION LIST

Patent Literature

Patent Literature 1: JP 2014-166102 A
Patent Literature 2: JP H08-126275 A

Non-patent Literature 1: Yuta Yamamoto and two others "High torque densitization of direct drive-type synchronous motor using flat wire coil with high space factor" issued on Mar. 5, 2013, (National Convention) The Institute of Electrical Engineers of Japan, National Convention Proceedings in 2013, Page 64 to 65, Dissertation No. 5-036

SUMMARY OF INVENTION

Technical Problem

However, since a coil with a square wire or flat wire manufactured by rolling a round wire is inevitably twisted in a winding process, there is a problem that it is very difficult to wind since a corner and a corner hit, and an insulation peels off. In particular, in the case of a flat wire having a rectangular cross section, it has directionality to bend without difficulty. In that respect, it becomes difficult to wind, in other words, bending processability is deteriorated.

In addition, even if the space factor of a flat wire molded into a band shape by rolling a round wire is improved compared to a round wire, a cross-sectional area as an electric wire for winding, that is, a conductor cross-sectional area, does not change. As a result, the generation of an eddy current is not necessarily improved. In other words, an eddy current increases in proportion to the cross sectional area of a coil conductor. Therefore, the heat generated by the generation of an eddy current lowers the output efficiency of a rotating machine. In order to suppress this eddy current, it is necessary to reduce the cross-sectional area of the electric wire for winding. However, since a current value is restricted, it will not be possible to realize a rotating machine with a large output.

In addition, a litz wire in which a large number of thin round wires is twisted together is flexible and easily wrapped around a small core, and it is preferable to apply to a compact motor. However, when a coil is formed by winding the litz wire, many gaps are created, and that point is similar to winding a round wire. That is, the coil made by winding a litz wire does not necessarily improve a space factor with respect to the coil made by winding a round wire.

As described above, in the conventional electric wire for winding and a coil or a rotating machine using the same, when a space factor is increased, it becomes difficult to wind, or an eddy current cannot be suppressed, and it is difficult to simultaneously achieve all of small size, light weight, high output, and high efficiency.

An object of the present invention is to provide an electric wire for winding, which can increase a space factor and can suppress an eddy current while facilitating winding processing. Another object of the present invention is to provide a coil having a high space factor as well as suppressing an eddy current.

Solution to Problem

In order to achieve the above objects, an electric wire for winding is a band-shaped flat wire or square wire and composed of a two-layered or two multiple-layered flat braided wire in which one enameled wire or a plurality of enameled wires bundled in parallel or in a litz shape is braided and molded flat.

Further, in a coil for a rotating machine, an electric wire for winding is a band-shaped flat wire or square wire and composed of a two-layered or two multiple-layered flat braided wire in which one enameled wire or a plurality of enameled wires bundled in parallel or in a litz shape is braided and molded flat, and the electric wire for winding is wound.

A plurality of connection bundles is provided at both ends of the wound electric wire for winding, and the number of turns of the coil may be made variable by connecting at least a part of a plurality of the connection bundles in series or in parallel between other coils or between connection bundles in the same coil. Further, the connection of the connection bundle at a coil connection point with another coil or at a wire connection point in the same coil is performed via a relay, and at least a part of a plurality of sets of the connection bundles can be switched and connected in series or in parallel by switching the relay. Further, a coil thickness of the coil for a rotating machine can be halved by displacing coils bent in opposite directions in an out-of-flux region outside a flux passage region so as not to overlap between the flux passage regions.

A method of manufacturing an electric wire for winding includes the steps of round braiding one enameled wire or a plurality of enameled wires bundled in parallel or in a litz shape into a single-layered or double or more layered cylindrical braided wire, flat braiding into two-layered or two multiple-layered flat braided wire by molding the cylindrical braided wire flat, and shaping the flat braided wire as a flat wire or a square wire.

In this method of manufacturing an electric wire for winding, it is preferable that in the round braiding step, a cylindrical braided wire is formed using a core, and in the flat braiding step, a cylindrical braided wire is molded flat after removing the core.

Furthermore, in the flat braiding step in the above-described manufacturing method of an electric wire for winding, when the cylindrical braided wire is molded flat and braided into a flat braided wire, the braided wire is pulled in a longitudinal direction orthogonal to a width direction.

Advantageous Effects of Invention

Since an electric wire for winding is a braided enamel wire, it has excellent flexibility, and it is easy to wind for forming a coil. Therefore, for forming a coil for a rotating machine, the electric wire for winding can be wound around a small core, and winding work becomes easy even with a small core or coreless.

Furthermore, since the electric wire for winding of the present invention molded into a flat wire or a square wire by a flat braided wire is a bundle of thin insulated enameled wires. Therefore, when it is used in a coil for a rotating machine, the generation of an eddy current is suppressed, and the heat generation associated with the generation of an eddy current is also suppressed as compared with a flat wire or a square wire having the same conductor cross-sectional area, manufactured by rolling a round wire. At the same time, a flat wire or square wire has an effect of improving heat dissipation due to surface contact. Therefore, it is possible to flow much more current. In other words, since an electric resistance is reduced, much more current can flow, and the efficiency as a coil for a rotating machine is improved.

Furthermore, since the electric wire for winding is a flat wire or square wire, a space factor when the electric wire is used for a coil in a rotating machine is increased by, for example, 20% to 30%, a resistance value can be made lower than in the case of a coil consisting of round wires having the same size, and the number of turns can be increased, and ampere turns per unit cross sectional area can be increased. In the case of a coil with the same performance (resistance value, number of turns), there is an effect of downsizing the coil.

In the case where the coil formed with the electric wire for winding is provided with a plurality of connection bundles of braided enameled wires, even after it is completed as a coil, by selectively connecting at least a part of the connection bundles in series or in parallel, the number of turns as a coil can be freely changed.

BRIEF DESCRIPTION OF DRAWINGS

FIG. 2(A) is a sectional view illustrating a state of a cylindrical hollow round braided wire immediately after braiding a nameled wire (the braided enameled wire is not illustrated). FIG. 2(B) is a cross-sectional view illustrating a state of a flat braided wire in which a hollow portion is compressed and molded flat. FIG. 2(C) is an explanatory view in the case where a crushing direction of the round braided wire is alternately switched in the vertical and horizontal directions to form a flat braided wire.

FIGS. 3(A)-3(F) are views illustrating an example of a coil molded using the electric wire for winding according to the present invention. FIG. 3(A) is a front view of a single-turn coil. FIG. 3(B) is a front view illustrating a state in which connection bundles of the single-turn coils are connected in series, and FIG. 3(C) is a side view thereof. FIG. 3(D) is a front view of a double-wound coil. FIG. 3(E) is a front view illustrating a state in which the connection bundles of the single-turn coils are connected in series, and FIG. 3(F) is a side view thereof.

FIG. 4(A) is a front view indicating a relationship between a coil and a magnet arrangement for one phase, and FIG. 4(B) is a side view thereof.

FIG. 5(A) indicates a state of series connection, and FIG. 5(B) indicates a state of parallel connection in two bundles.

FIG. 6(A) indicates a state of series connection, and FIG. 6(B) indicates a state of parallel connection.

FIG. 8(A) is a front view indicating an arrangement relationship of an axial gap-type coil in relation to magnets. FIG. 8(B) is a side view of the coil. FIG. 8(C) is an enlarged front view of the coil in a state in which the coil is bent out of plane outside a flux linkage region of the coil sandwiched between a pair of magnets, and the coils are partially overlapped. FIG. 8(D) is a side view of the case where the same coil is not overlapped. FIG. 8(E) is a side view in the case of overlapping the same coil.

FIGS. 11(A)-11(D) are views illustrating an example of a single radial gap-type permanent magnet-type rotating machine using the coil according to the present invention as a stator coil. FIG. 11(A) is a front view, FIG. 11(B) is a longitudinal sectional view, FIG. 11(C) is a plan view illustrating an example of a lap-winding coil, and FIG. 11(D) is a side view thereof.

DESCRIPTION OF EMBODIMENTS

Figure 1:
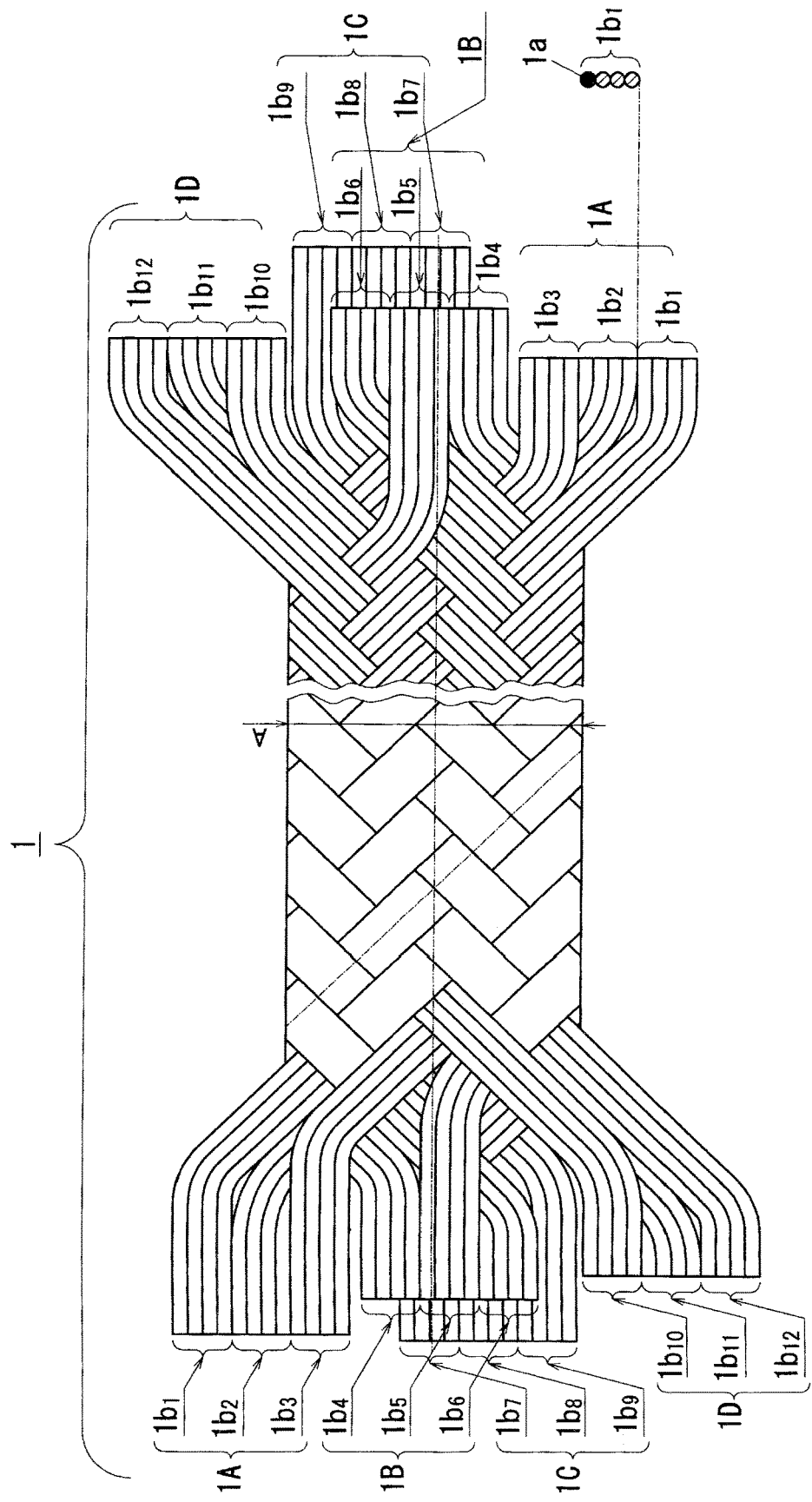
FIG. 1 is a plan view illustrating an embodiment of an electric wire for winding according to the present invention.

Hereinafter, the configuration of the present invention will be described in detail based on the embodiments illustrated in the drawings.

FIG. 1 shows an embodiment of an electric wire for winding according to the present invention. An electric wire 1 for winding is a flat wire or square wire and composed of a two-layered or two multiple-layered flat braided wire in which one enameled wire 1a or a plurality of enameled wires 1a bundled in parallel or in a litz shape is braided and molded flat. For example, the electric wire 1 for winding forms a cylindrical round braided wire by braiding one enameled wire 1a or a plurality of the enameled wires 1a or a plurality of twisted wires as one unit (refer to FIG. 2(A)). After that, a hollow portion is compressed and molded flat to form a two-layered or two multiple-layered flat braided wire, and shaped as a flat wire or a square wire (refer to FIG. 2(B)). A dimension in the drawing is the width of the flat braided wire, and B dimension is the thickness (length on the edge side/short side) of the flat braided wire. Reference sings 1A to 1D in the drawing denote connection bundles forming one unit of connection, and 1b denotes a bundle of the enameled wires 1a or one unit of twisted wires, and for distinguishing each bundle of enameled wires, for example, the bundles are indicated by $1b_1$ to $1b_{12}$ with 1 to 12 attached.

The electric wire 1 for winding according to the present embodiment is braided, for example, into twelve bundles ($1b_1$ to $1b_{12}$) by two bundles of parallel braiding with four enameled wires 1a as one bundle by a braiding machine. Further, a double cylindrical round braided wire 1' (refer to FIG. 2(A)) is formed by further round braiding after round braiding. Next, for example, the hollow portion is crushed by a press to compress the hollow portion to form a four-layered flat braided wire (refer to FIG. 2(B)). In the case of the present embodiment, the electric wire 1 for winding including flat braided wires is composed of forty eight enameled wires 1a (four wires in one bundle, twelve bundles), and three bundles are connected in parallel to form one as connection bundles, four connection bundles 1A to 1D are formed.

When braiding the enameled wire 1a, the core 2 is preferably used. It is possible to braid without using the core 2, but in the case of braiding using the core 2, the arrangement of the enameled wires 1a when a flat braided wire is used is aligned and densely arranged, and therefore a space factor can be further increased. Further, when the hollow portion of the round braided wire 1' is compressed and formed flat while being crushed by a press, it is preferable to pull in the longitudinal direction orthogonal to the width direction of the braided wire. As a result, since the flat braided wire is shaped into a flat wire or a square wire in a stretched state, even when tension is applied when winding a coil, the wire does not stretch at that time. In addition, a flat braided wire is molded flat after forming a cylindrical braided wire by round braiding an enameled wire, and the flat braided wire is shaped as a flat wire or a square wire. Therefore, a flat or square electric wire for winding consisting of a flat braided wire, which is an assembly of enameled wires with a small cross-sectional area can be easily manufactured. In addition, at both ends of the electric wire for winding, that is, at both ends of the coil, a plurality of connection bundles forming one unit of connection is formed without special processing.

In addition, although the electric wires 1 for winding illustrated in FIG. 1 are braided as a bundle of a plurality of enameled wires 1a disposed side by side, but this is not particularly limited thereto, and a plurality of the enameled wires 1a may be twisted together, for example, a litz wire to be braided as one unit (one bundle), and each one enameled wire 1a may be braided. Further, the braiding method in the present embodiment is a double round braid having four layers in the flat braided wire state. In some cases, a single braid having two layers in a flat braided wire state or a triple braid having six layers in a flat braided wire state may be used. For example, the electrical wires can be braided in quadruple by double round braiding on a state of double round braiding, and it may be crushed to form a flat braided wire with eight layers and eight connection bundles and then molded into a flat wire or a square wire. Further, the method of crushing the round braided wire 1' may be, for example, either from the longitudinal direction or from the lateral direction, or may be alternately crushed longitudinally or horizontally as illustrated in FIG. 2(C). In the above-described embodiment, two bundles are braided in parallel by crossing two bundles upper and lower, but this is not particularly limited thereto, and one bundle or three or more bundles may be braided.

The enameled wire is a varnish of insulating resin baked on a conductor, and various insulating resins can be used, and for example, polyurethane copper wire (UEW), polyester copper wire (PEW), polyester imide copper wire (EIW), polyamide imide copper wire (AIW), polyimide copper wire (PIW), and the like are generally used, but it is not limited to these. Here, among enameled wires, a polyurethane copper wire is preferably used. In the case of this polyurethane copper wire, since an enamel film is peeled off when heat is applied, the enamel film can be peeled off and connected only by immersing the coil in a solder bath. Therefore, the connection work for each large number of wires is facilitated. In addition, in the case of a polyurethane copper wire, in the case of forming a flat braided wire in which a hollow portion is compressed and molded flat (FIG. 2(B)) after once being braided into the hollow round braided wire 1' (FIG. 2(A)), it is prevented that the enameled wire 1a moves by a tension applied to braid the enameled wire 1a and a pressure at the time of pressing, and a wire interval is varied and misaligned. Consequently, peeling of enamel coating of the enameled wire 1a is prevented, and disturbance of the arrangement of the enameled wire 1a is effectively prevented. The material of the enameled wire 1a is generally a copper wire, but this is not particularly limited thereto, and an aluminum wire, OFC (oxygen-free copper wire), nickel-plated soft copper wire, and the like can also be used.

The enameled wire 1a is not required to have a specific cross-sectional shape and may be a round wire, a square wire, or a flat wire. Further, the shape of the round braided wire before being processed into a flat braided wire is not particularly limited to a cylinder illustrated in FIG. 2(A) and may be an elliptical cylinder or a polygonal cylinder.

Here, it is desirable that the enameled wire 1a be sufficiently thin compared to a cross-sectional area of a conductor as the electric wire 1 for winding, and a wire diameter can maintain sufficient flexibility in the case of forming a flat braided wire. For example, a round enameled wire having a diameter of about 0.05 to 1.2 mm, a square enameled wire or a polygonal enameled wire having a diameter of about 0.05 mm×0.05 mm to 1.2 mm×1.2 mm, and the like which are generally marketed can be used. However, it is preferable to use a thick wire to increase the output of a rotating machine, but from the viewpoint of maintaining the flexibility as a flat braided wire and reducing an eddy current loss, a wire as thin as possible, and for example an enameled wire of 1 mm or less in diameter is preferably used. Therefore, the wire diameter may be appropriately selected for example within a range of 0.05 to 1 mm in order to achieve flexibility as a flat braided wire, increase in a space factor, and reduce an eddy current loss, and within a range of about 0.05 to 0.6 mm, preferably about 0.05 to 0.5 mm, and more preferably about 0.05 to 0.26 mm when relatively large output is not required.

Figure 2A:
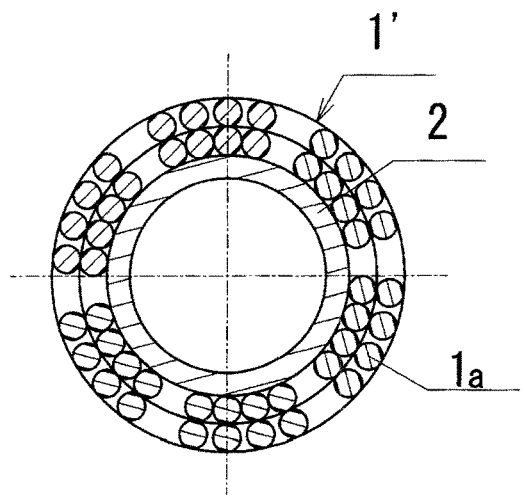
FIGS. 2(A), 2(B) and 2(C) are views for explaining a process of braiding the electric wire for winding according to the present invention.
Figure 2B:
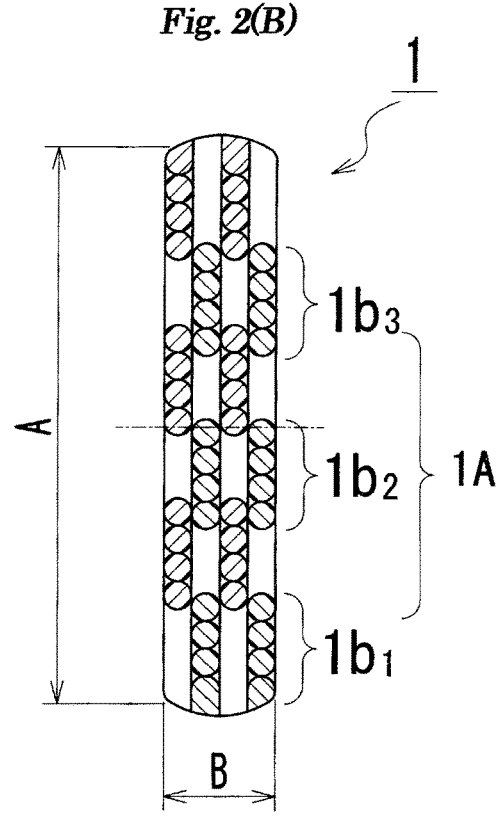
Figure 2C:
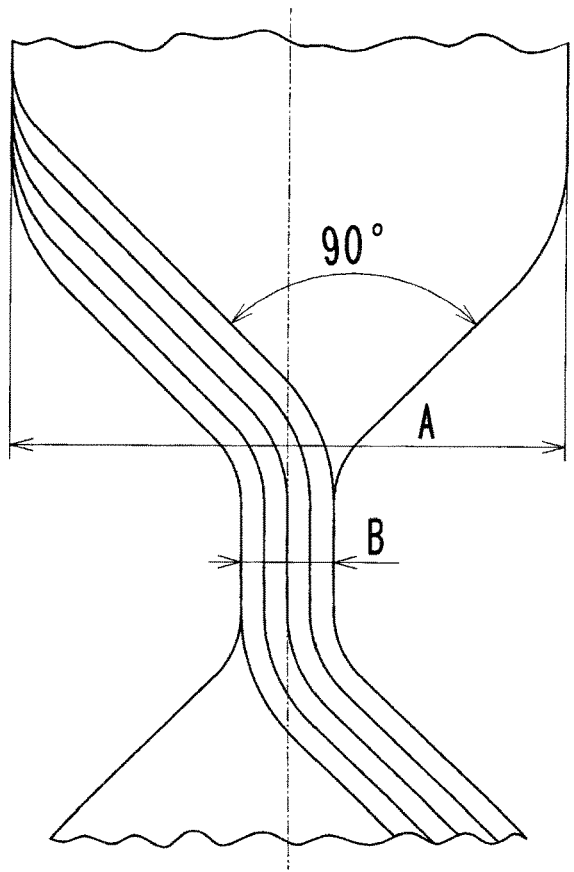

For example, as illustrated in FIG. 2(A), twelve bundles are braided, for example, by parallel braiding two bundles of each four enameled wires 1a having 0.3 mmφ diameter around a vinyl rod or a pipe core 2, and a flat braided wire is formed which is molded flat by compressing a hollow portion after forming the cylindrical round braided wire 1' by drawing the cores 2. As a result, the electric wire 1 for winding in FIG. 1 is formed which is flexible and composed of a flat wire with a width of 3.6 mm and a thickness of 1.2 mm. In this case, the enameled wires as the flat braided wire are aligned and densely disposed, such that a space factor of the electric wire for winding in forming a coil can be further increased.

By using the electric wire 1 for winding which is a flat wire or square wire and composed of flat braided wires configured as described above, various coils and rotating machines can be made as in the case of round enameled wires. For example, FIGS. 3(A)-3(F) indicate an example of forming a trapezoidal coil suitable for using in a face-to face motor (referred to as a flat motor) by using the electric wire 1 for winding according to the present invention. In the coil 3 of this type, it is desirable that the edge side (short side of the width B) of the flat braided wire 1 faces a magnet. Therefore, the coil is molded by winding in a spiral such that the long side surface (surface of the width A) of the flat braided wire is overlapped.

The number of turns of the coil 3 can be changed by connecting a plurality of connection bundles, for example, four connection bundles 1A to 1D in series or in parallel between the connection bundles of other coils or between other connection bundles in the same coil. For example, FIGS. 3(A) to 3(C) indicate examples of a single-wound coil in which one electric wire 1 for winding is spirally wound from the inner side, and finished winding on the outer side. The coil 3 has, for example, a coil winding start 3s consisting of four connection bundles 1A to 1D on the inner peripheral side, and a coil winding end 3f on the outer peripheral side. The number of turns of the coil 3 can be changed by connecting the connection bundles 1A to 1D in series or in parallel with other coils or with connection bundles in the same coil. For example, by coil-connecting in series three connection bundles among four connection bundles 1A to 1D of the coil on the winding start 3s side to three connection bundles among four connection bundles 1A to 1D of the coil on the winding end 3f side at a coil connection point 4, a coil consisting of the winding start 3s of one connection bundle and the winding end 3f of one connection bundle can be formed. Note that, in the middle coil, the four connection bundles 1A to 1D are all connected to corresponding four connection bundles 1A to 1D of other coils.

Further, FIGS. 3(D) to 3(F) indicate examples of a double-wound coil 3' (also referred to as a-winding or double pancake) in which the winding start 3s and the winding end 3f are positioned on the outer periphery of a coil. In the double-wound coil 3', two coils are continuously molded by winding in a spiral one electric wire 1 for winding having a plurality of connection bundles, for example, four connection bundles 1A to 1D from the inner side to the right and left in two rows and finishing winding on the outer side (refer to FIG. 3(F)). The double-wound coil 3' is a coil element in which a conductor is spirally wound in upper and lower two layers. Similar to the single-wound coil 3 described above, for example, in the double-wound coil 3', the number of turns as a coil can be changed by connecting at least a part of the four connection bundles 1A to 1D in series or in parallel between other coils or between connection bundles in the same coil. For example, three connection bundles in the winding start 3s on the coil outer periphery are coil-connected in series to three connection bundles on the winding end 3f side of the coil outer periphery by coil connection at the coil connection point 4 to form a double-wound coil 3' consisting of the winding start 3s of one bundle and the winding end 3f of one bundle.

Then, after the electric wire 1 for winding is molded into a coil, it is solidified. For example, the respective wires and further the respective bundles are adhered and fixed to each other by an insulating resin, a paint or the like. In the case of the present embodiment, after being processed into a coil shape, the electric wire 1 for winding is solidified with an insulating paint made of a heat resistant resin or the like at about 120° C. In this case, when the coil is wound, the flexibility of the electric wire for winding can be utilized to easily and tightly wind the coil without gaps, and after forming into a coil shape, the coil is fixed by adhesion etc. such that it can be easily formed into a desired coil shape.

The single- or double-wound coil 3, 3' configured as described above can form, for example, an axial gap type or radial gap type coil for a rotating machine, which is used for a permanent magnet type rotating machine, by wave winding or lap-winding.

Figure 4B:
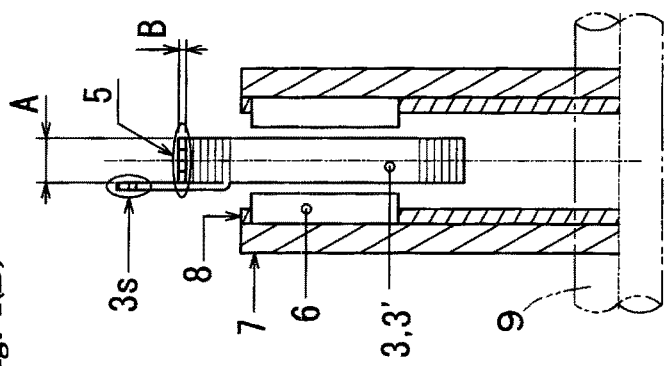
FIGS. 4(A) and 4(B) are principle views of an embodiment of an axial gap-type coil using the single-turn coil.
Figure 4A:
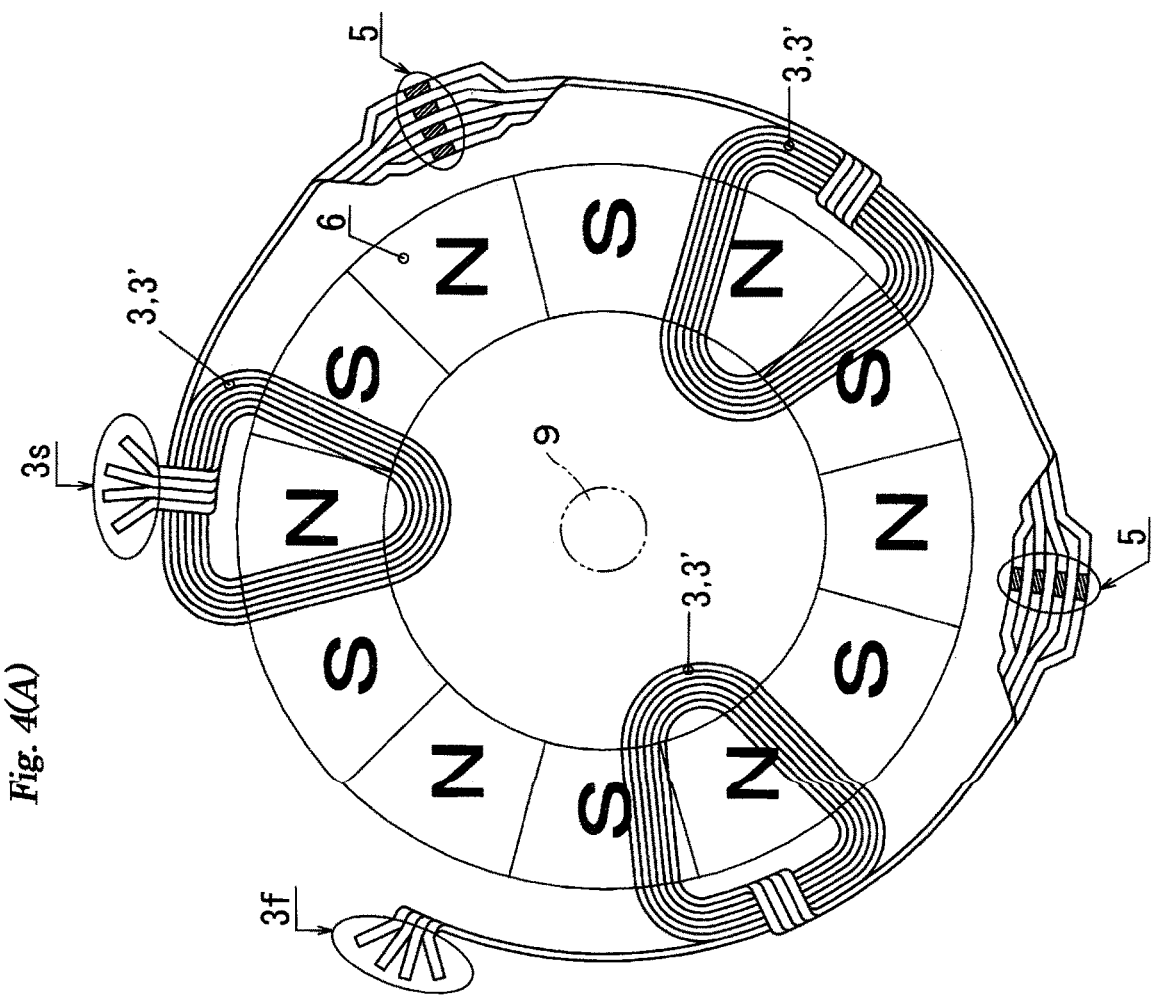

For example, FIGS. 4(A) and 4(B) illustrate an example of an axial gap type coil using the above-described coil and a method of connecting the coil. FIG. 4(A) indicates a state in which the coils in one phase is disposed with respect to an annually disposed permanent magnet with six poles. In the case of the present embodiment, the coils in one phase include three turns of the coils 3, 3', and four connection bundles 1A to 1D from the winding end 3f of the coil on the winding start side to the winding start 3s of the next coil are connected at a wire connection point 5, and further, four connection bundles 1A to 1D from the winding end 3f of the middle coil to the winding start 3s of the coil on the winding end side are connected at the wire connection point 5. The drawing illustrates a state in which the connection bundles 1A to 1D between the two coils are respectively connected in a branched state, but the connection bundles 1A to 1D may be connected together as one, that is, connected as one connection bundle. Then, by the three-turn coils 3, 3' disposed in an annular shape along a magnet 6, a coil circuit is formed in which the coil starts winding from the outer side in the radial direction of the annular shape and finishes winding on the outer side. As illustrated in FIG. 4(B), for example, in the case of the flat wire-shaped electric wire 1 for winding, the coils 3, 3' are disposed in a gap portion between a pair of the magnets 6 disposed so as to face each other, such that an edge, that is a short side surface faces the magnets (in other words, such that the long side surface of the electric wire 1 for winding is parallel to a rotor shaft 9). In the drawing, reference sign 6 denotes a permanent magnet, 7 denotes a yoke, 8 denotes a magnetic or nonmagnetic magnet holder, and 9 denotes a rotor shaft. As a coil circuit including a plurality of the coils 3, 3' disposed annularly along the magnet 6, it is not limited to the above-described embodiment of the coil with an outer winding start and an outer winding end, and a coil may start winding on the inner side in the radial direction and finish winding on the inner side.

Figure 5A:
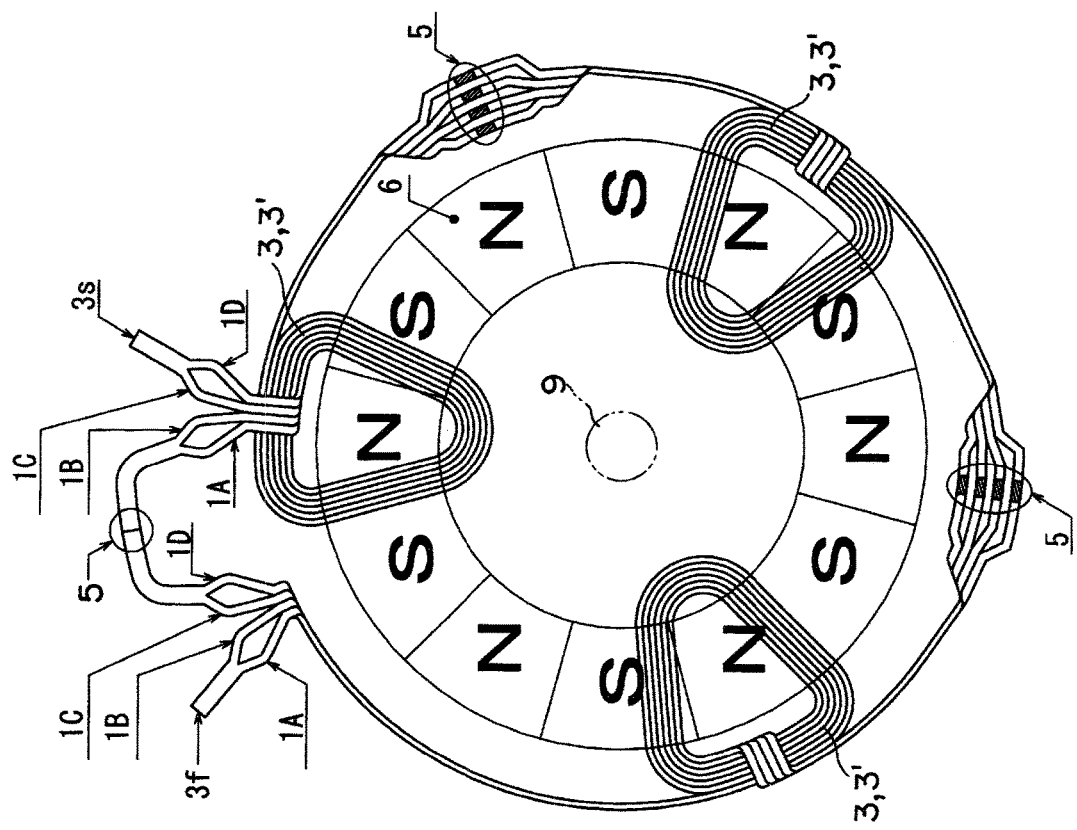
FIGS. 5(A) and 5(B) are front views indicating a relationship between coils and magnets of one phase in a three-phase axial gap-type coil using the coil illustrated in FIGS. 3(A)-(F).
Figure 5B:
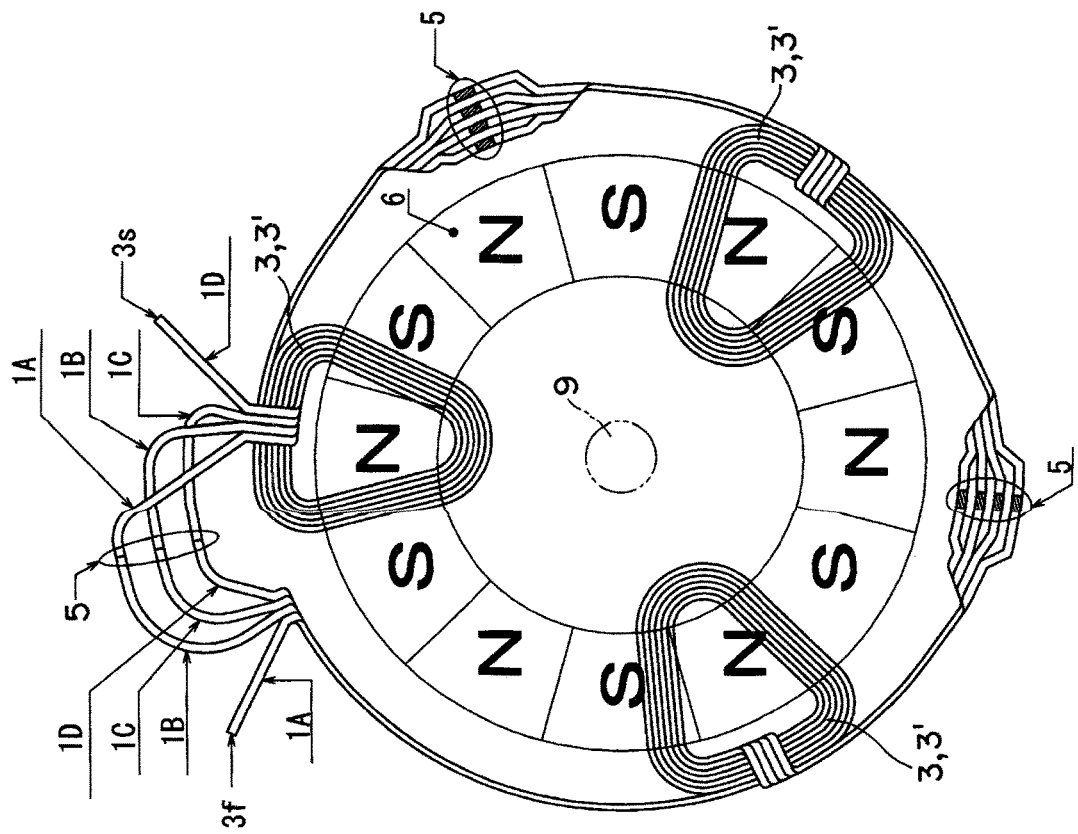

Further, as illustrated in FIG. 5(A), three of the four connection bundles 1A to 1D which are the winding start of the coils 3, 3' on the winding start side, for example, the connection bundles 1A to 1C are connected in series at the wire connection point 5 to three of the four connection bundles 1A to 1D which are the winding end of the coils 3, 3' on the winding end side, for example, the connection bundles 1B to 1D, and a series connected coil can be formed which includes the winding start 3s of one connection bundle, for example, 1D and the winding end 3f of one connection bundle, for example, 1A. Further, as illustrated in FIG. 5(B), two bundles of four connection bundles which are the winding start 3s of the coils 3, 3' on the winding start side, for example, 1A and 1B and 1C and 1D are connected in parallel to each other, and the four connection bundles 1A to 1D between the coils 3, 3' are connected each other in series at the wire connection point 5. Then, two bundles, for example, 1C and 1D, in the connection bundles which are the winding end 3f of the last coil 3, 3' is coil-connected at the wire connection point 5 to one of two pairs of the connection bundles connected in parallel at the coil winding start, for example, 1A and 1B, to form a parallel connected winding circuit, in which two connection bundles are connected in series.

Figure 6A:
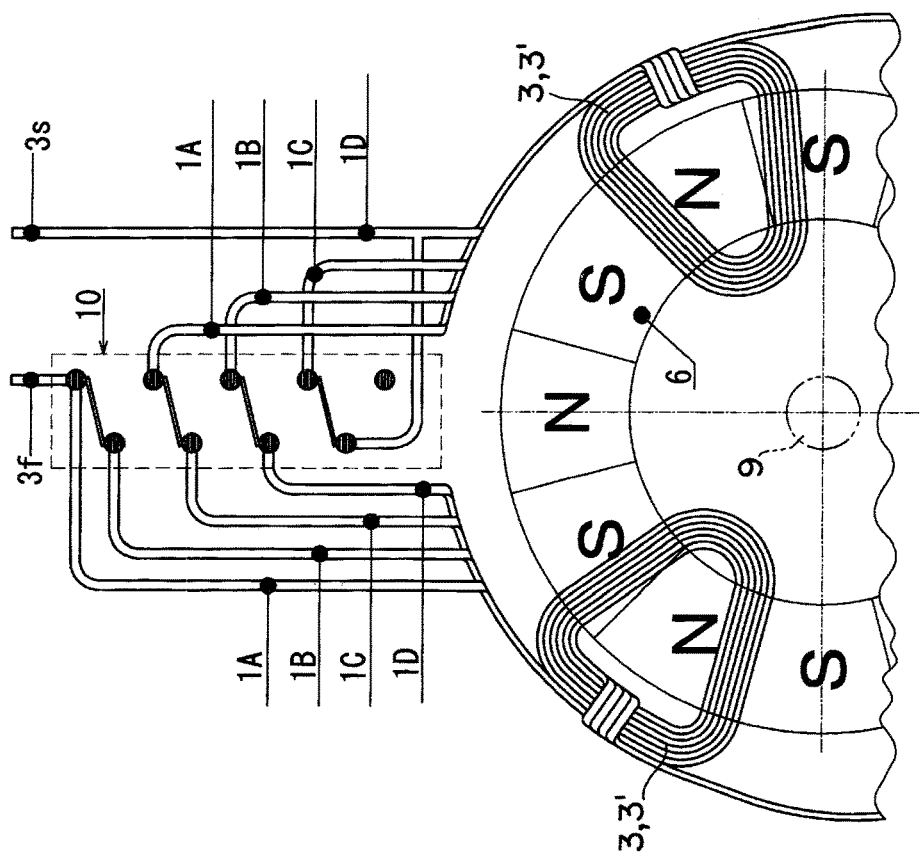
FIGS. 6(A) and 6(B) are front views indicating a relationship between coils and magnet arrangement of one phase in a three-phase axial gap-type coil in which the coil in FIGS. 3(A)-(F) is connected using a relay connection.
Figure 6B:
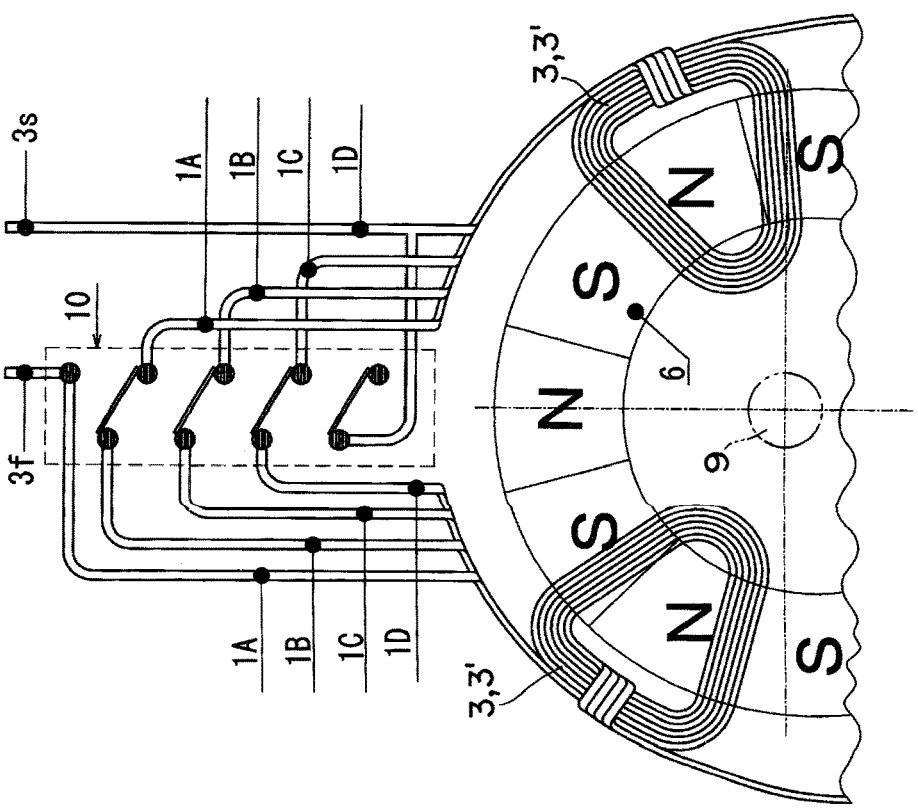

The connection of a plurality of connection bundles, for example, four connection bundles 1A to 1D, at the coil connection point 4 or the wire connection point 5 of each coil 3, 3' may be switched using relay connection or the like in some cases. For example, as illustrated in FIGS. 6(A) and 6(B), if the four connection bundles 1A to 1D which are the winding start 3s of the winding start side coil 3, 3' and the four connection bundles 1A to 1D which are the winding end 3f of the winding end side coil are connected via a relay circuit 10, it is possible to switch to a series connected coil as illustrated in FIG. 6(A) and to switch to a parallel connected coil in an instant as illustrated in FIG. 6(B). One of the connection bundles 1A to 1D which are the winding start 3s and the winding end 3f is branched into a connection bundle connected to the relay circuit 10 and a connection bundle as the winding start 3s.

Figure 7:
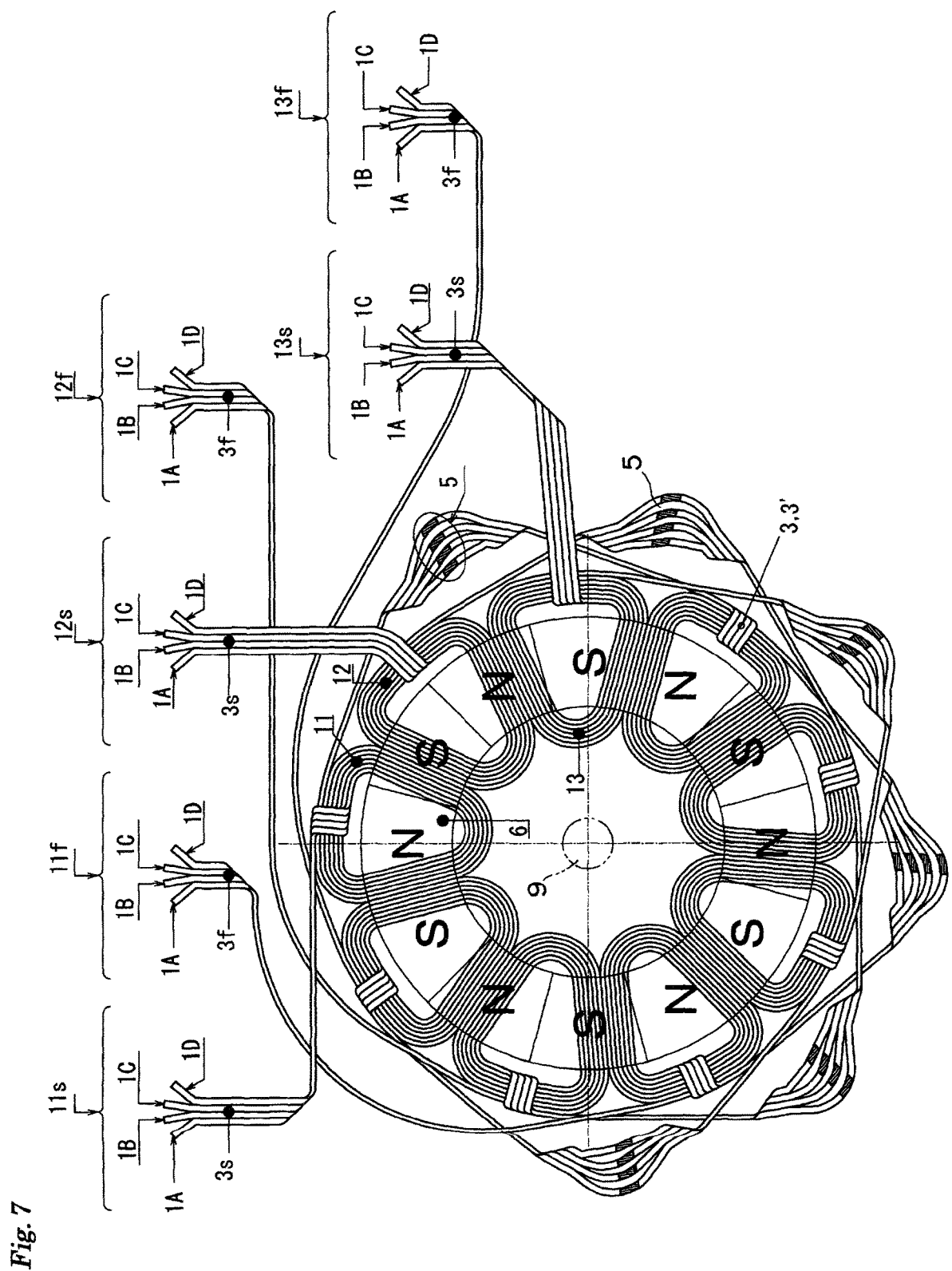
FIG. 7 is a front view indicating a relationship between a three-phase axial gap-type coil and a magnet arrangement using the coils of FIGS. 3(A)-3(F) in series connection.

FIG. 7 illustrates an example of the arrangement of coils and magnets for three phases of an axial gap type coil. The coil can be configured as a three-phase alternating current rotating machine (permanent magnet type rotating machine), or can be configured as a DC rotating machine by adding a commutator. In this coil, three single-would coils 3, 3' are disposed circumferentially in order of three phases, and the coils 3, 3' in the same phase are coil-connected, and four connection bundles 1A to 1D that are the winding start 3s and the winding end 3f are drawn out from the coil 3, 3' at the end of each phase. The coils 3, 3' are consolidated and integrated with resin and adhesive, and the arrangement relationship with the magnet 6 is maintained such that a linear conductor portion linking each magnet 6 of the coils 3, 3' functions as an N pole side flux linkage portion and an S pole side flux linkage portion. In the drawing, reference sign 11 denotes a U phase coil, 12 denotes a V phase coil, 13 denotes a W phase coil, 11s denotes a U-phase coil winding start, 12s denotes a V-phase coil winding start, 13s denotes a W-phase coil winding start, 11f denotes a U-phase coil winding end, 12f denotes a V-phase coil winding end, and 13f denotes a W-phase coil winding end.

Further, FIGS. 8(A)-8(E) indicate an example of the arrangement of coils and magnets for three phases in the case where axial gap type coils are lap wound. As with the coil illustrated in FIG. 7, the coil can be configured as a three-phase alternating current rotating machine (permanent magnet type rotating machine), or can be configured as a DC rotating machine by adding a commutator. Each coil 3, 3' of the U-phase coil 11, the V-phase coil 12, and the W-phase coil 13 is annually arranged in the circumferential direction on the front side, for example, in order at intervals of 120° in an electrical angle (in the case of the present embodiment, 40° in a mechanical angle). On the other hand, three-phase coils 3, 3' of the U-phase coil 11, the V-phase coil 12, and the W-phase coil 13 are annularly arranged on the back side in the circumferential direction in order by shifting 60° in an electrical angle (20° in the case of the mechanical angle in the present embodiment) from the coils 11, 12, and 13 of the respective phases on the front side. That is, by lap-winding the coils of FIG. 7 on the front and back, the number of coils is increased.

Figure 8:
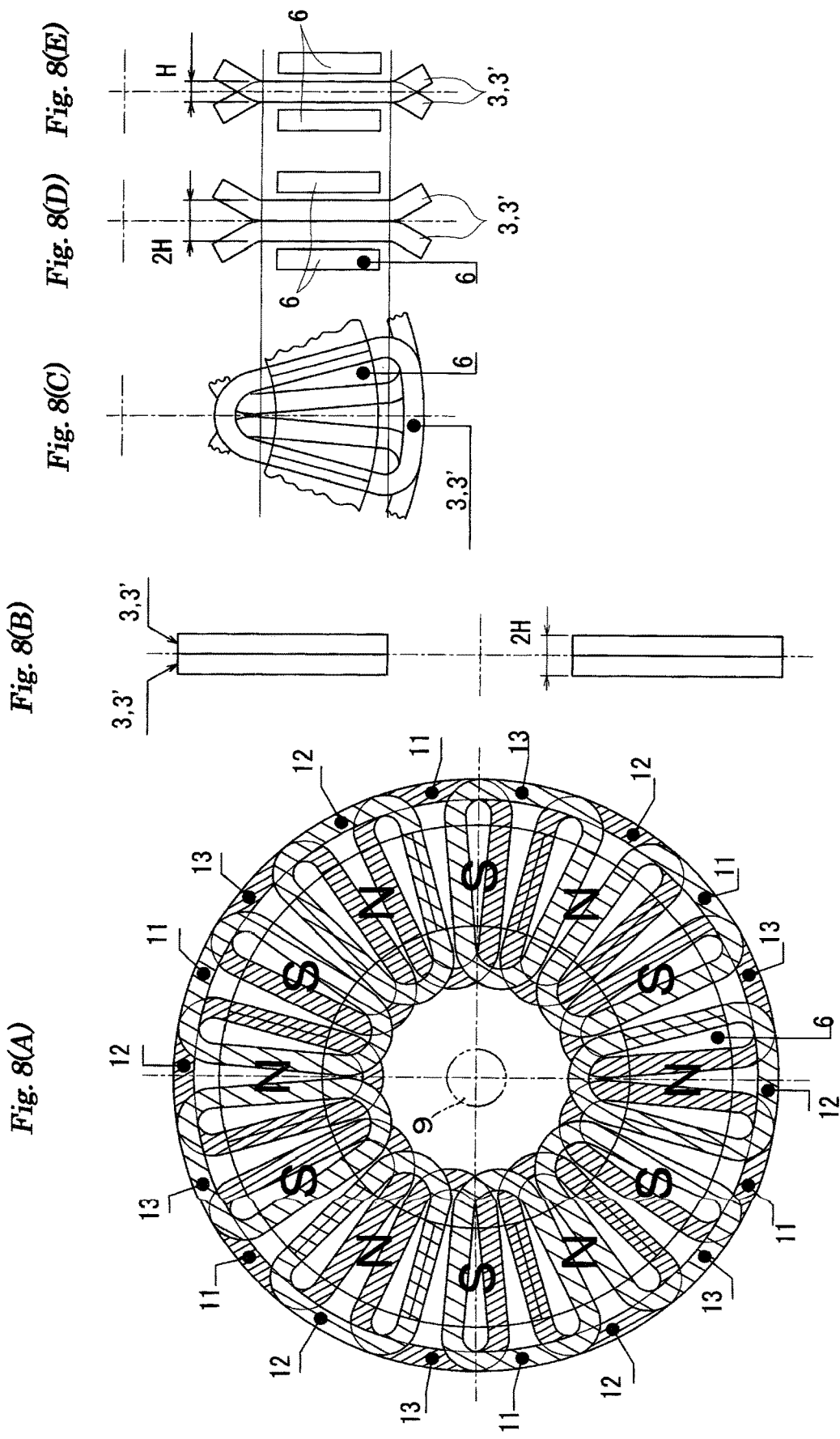
FIGS. 8(A)-8(E) are views illustrating an example of a method of alternately overlapping and winding on the front and back such that coils partially overlap.

In this coil arrangement, as illustrated in FIG. 8(B), the coils 11, 12, 13 of the respective phases on the front side and the coils 11, 12, 13 of the respective phases on the back side may simply be disposed in an overlapping manner, but as illustrated in FIG. 8(E), portions protruding out of a space between the opposing magnets 6 (referred to as out-of-flux passing region) are bent in opposite directions, and as illustrated in FIG. 8(C), the flux passing regions of the front side coil and the back side coil are disposed to be shifted in the circumferential direction so as not to overlap each other. Consequently, the coil thickness can be halved (a thickness H for one coil) in the coil region occupied by a space between the magnets 6, that is, in the flux passing region. The coil is easily braided since the coil is a braided wire. The coils may be single-wound coils, double-wound coils, single-lap wound coils, or double-lap wound coils.

Figure 9:
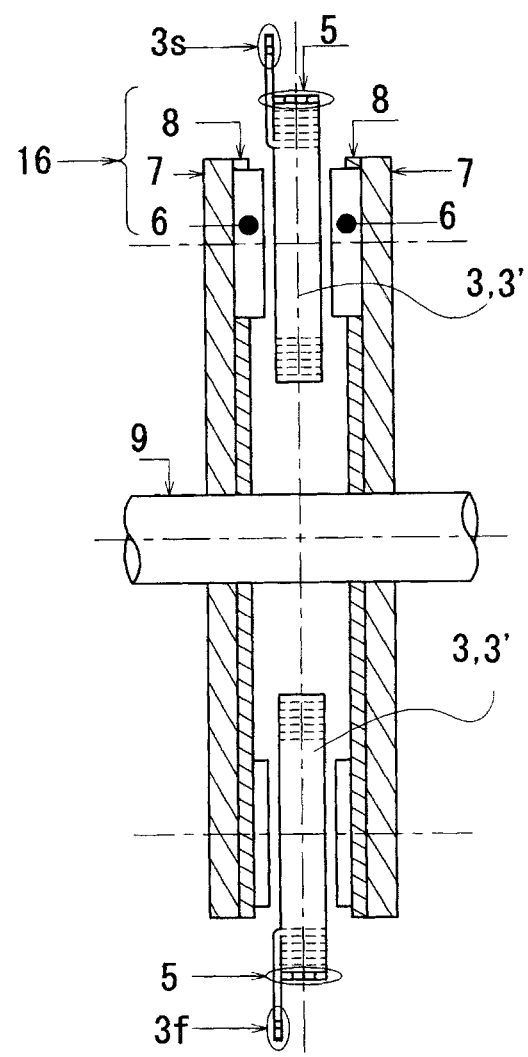
FIG. 9 is a longitudinal sectional view indicating an example of a single axial gap-type AC facing motor (permanent magnet type rotating machine) using the coil according to the present invention as a stator coil.

Further, FIG. 9 illustrates an example of a single axial type permanent magnet type rotating machine using the above-described coil as a stator coil. As illustrated in FIG. 9, like the coil illustrated in FIGS. 4(A) and 4(B), the coils 3, 3' of the present embodiment are disposed in a gap portion between a pair of the oppositely disposed magnets 6 such that a surface on the edge side of the electric wire 1 for winding opposes the magnets 6. In the present embodiment, the magnet 6 is held by the disk-shaped yoke 7 fixed to the rotor shaft 9 via the magnetic or nonmagnetic magnet holder 8, but it is not particularly limited thereto. According to the present embodiment, although a rotating machine sandwiches the coils 3, 3' by an NS magnetic circuit from both sides, one side may be a magnetic yoke (not illustrated) instead of the magnet 6. Reference sign 16 in the drawing denotes a rotor magnetic body. Furthermore, it is obvious that the coils 3, 3' are configured as a stator coil in this embodiment, but it can also be configured as a rotor coil depending on the case.

Figure 10:
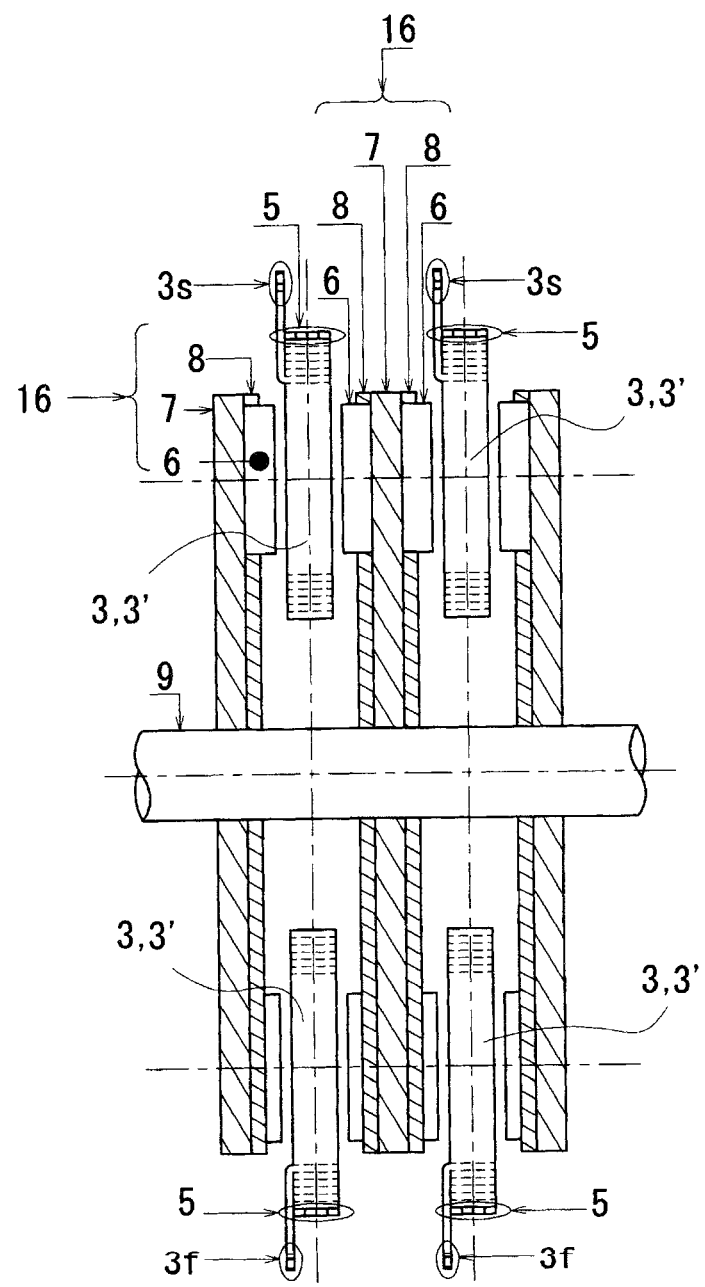
FIG. 10 is a longitudinal sectional view indicating an example of a double axial gap-type AC facing motor (permanent magnet type rotating machine) using the coil according to the present invention as a stator coil.

Furthermore, FIG. 10 indicates an example of a double axial type permanent magnet type rotating machine using two sets of the above-described coils 3, 3' as stator coils. In the rotating machine according to the present embodiment, the permanent magnets 6 are disposed on both the front and back sides of the central yoke 7, and two pairs of magnetic circuits are formed with the permanent magnets 6 disposed opposite to each other on the outer side in the axial direction. A magnet holder denoted by reference sign 8 may be a magnetic body or a nonmagnetic body, but preferably a magnetic body. The thickness of a holder is desirably ½ or less of the thickness of the magnet. Furthermore, reference sign 16 in the drawing denotes a rotor magnetic body.

The coils 3, 3' are disposed in a gap portion between a pair of the opposingly disposed magnets 6 such that a surface on the edge side of the electric wire 1 for winding opposes the magnets 6. In the present embodiment, the magnet 6 is held by the disk-shaped yoke 7 fixed to the rotor shaft 9 via the magnetic or nonmagnetic magnet holder 8, but it is not particularly limited thereto. According to the present embodiment, although the rotating machine sandwiches the coils 3, 3' by an NS magnetic circuit from both sides, one side may not be the magnet 6 and may be a magnetic yoke (not illustrated). Furthermore, it is obvious that the coils 3, 3' are configured as a stator coil in this embodiment, but it can also be configured as a rotor coil depending on the case.

In addition, since the electric wire 1 for winding of the present embodiment is a flat wire or a square wire composed of a flat braided wire and is excellent in flexibility, and therefore it can be easily twisted or bent in the middle of a wire. For this reason, it is possible to facilitate a work or to increase a wiring density by wiring in a straight line by twisting the flat wire by 90° at the time of wiring, coil connection, or wire connection. As a result, there is an advantage of being compact.

Further, as illustrated in FIGS. 11(A)-(D), for example, the coils 3, 3' of the present embodiment can also be configured as a radial type stator coil of a permanent magnet type rotating machine. In this case, for example, in the coils 3, 3', a single-wound coil or a double-wound coil wound in a rectangular shape or a tortoise shell shape as illustrated in FIG. 11(C) is disposed in a circumferential direction and lap wound or wave wound connected to form an annular shape, and disposed in a gap portion between an inner rotor magnetic body 14 and an outer rotor magnetic body 15. For example, in the case of forming a three-phase coil, as illustrated in FIG. 11(C), coils in three phases are disposed so as to partially overlap in order. Then as illustrated in FIG. 11(B), a surface on the edge side of the flat braided wire of the electric wire 1 for winding is disposed between the both magnets so as to face the magnet 6. At this time, if the portions of the coil 2 that protrude out of the space between both magnets are alternately bent in the opposite direction on an outer side and the inner side in the radial direction each other as illustrated in FIG. 11(D) and lap wound as illustrated in FIG. 11(C), the magnetic flux linkage between a pair of the magnets 6 is configured as a coil having a thickness corresponding to one coil width H (B dimension× number of turns). As a result, the gap length can be narrowed according to the coil density. In other words, the coil density can be increased while the gap length is narrow. Since the coils 3, 3' configured by the electric wire 1 for winding have flat braided flexibility, and it is easy to mold as coils and bend a portion protruding out of the space between the both magnets of the coils 3, 3'. The inner rotor magnetic body 14 includes a ring-shaped yoke 7 fixed to the rotor shaft 9 and the magnet 6 held by the yoke 7 via a magnetic or nonmagnetic magnet holder 8. Further, the outer rotor magnetic body 15 includes the ring-shaped yoke 7 fixed to a rotor casing (not illustrated), and the magnet 6 held by the yoke 7 via the magnetic or nonmagnetic magnet holder 8.

In the rotating machine using these coils for rotating, an electric wire for winding which is a flat wire or a square wire composed of a flat braided wire has excellent flexibility, it is easy to wind, and also an eddy current is suppressed, and a space factor also increases, and therefore the electrical resistance is reduced, and much more current flow to improve efficiency. Thus, the rotating machine increases ampere-turns per unit cross-sectional area, and small size, light weight, high output, and high efficiency can be achieved.

The above-described embodiment is an example of the preferred embodiment of the present invention, but is not limited thereto, and various modifications can be made without departing from the scope of the present invention. For example, as an example of a coil including an electric wire for winding according to the present invention, in the above-described embodiment, an example in which the coil is applied to a coreless coil and a coreless motor has been mainly described, but it is not particularly limited thereto, and it is obvious that the coil can also be applied to a coil having a core and a motor. In this case also, an electric wire for winding formed with a flat braided wire can be easily wound around a small core and can be a coil with a high space factor, and therefore a coil and a motor can be compact, lightweight and have high output power and high efficiency.

Further, in the above-described embodiment, although an example in which the electric wire for winding is applied to a permanent magnet type rotating machine has been mainly described, it is not particularly limited thereto, and it is obvious that the electric wire for winding can be applied to all rotating machines. Furthermore, the electric wire for winding can be used as an induction machine alone, and can be incorporated not only as an induction machine but also as a stator coil or a rotor coil of a synchronous machine. Further, in the above-described embodiment, although the example of a stator coil has been described, it is not particularly limited thereto, and it is obvious that the electric wire for winding can be used as a rotor coil. It is obvious that a radial type or axial type may be used as a coil.

Furthermore, in the above-described embodiment, although the example in which the electric wire for winding is applied to a coil for a rotating machine has been mainly explained, it is not limited to this in particular, and the electric wire for winding can be applied as a coil in other technical fields, for example, a cordless non-contact charger coil or a solenoid coil or the like.

Further, since the electric wire 1 for winding according to the present invention is a flat wire or a square wire composed of a flat braided wire, it is excellent in flexibility in a direction in which the edge side (short side side) is not easily bent. Therefore, it is useful since it is easily processed in the case of winding as an edgewise coil. Further, according to the electric wire 1 for winding of the present invention, the coil shape is not limited to the above-described trapezoidal shape, and it can be easily finished as a coil of various shapes required, such as a coil wound in a rectangular, round, or saddle shape.

Furthermore, in the above-described embodiment, a coreless coil of a single phase or multiple phases can also be formed by selectively connecting the winding start $3s$ and the winding end $3f$ of the coils 3, 3' with the winding start $3s$ or the winding end $3f$ of the other coils 3, 3'.

REFERENCE SIGNS LIST 1 electric wire for winding
1a enameled wire $1b_1$ to $1b_{12}$ bundle of enameled wires or a unit of twisted wires (litz wires)
1A to 1D connection bundle
3, 3' coil for rotating machine

The invention claimed is:

1. A coil for a rotating machine, the coil comprising a wound electric wire for winding which is a band-shaped flat wire or square wire and which is composed of a two-layered or two multiple-layered flat braided wire in which one enameled wire or a plurality of enameled wires bundled in parallel or in a litz shape to form a bundle of enameled wires is braided and molded flat,
   wherein a plurality of connection bundles which form a unit of connection of the enabled wire or bundle of enameled wires is provided at both ends of the wound electric wire for winding such that a number of turns of the coil can be changed by connecting at least part of the plurality of connection bundles in series or in parallel with connection bundles of the coil to form a coil connection point or with connection bundles of another coil to form a wire connection point.

2. The coil for a rotating machine according to claim 1, wherein the enameled wire is a polyurethane wire.

3. The coil for a rotating machine according to claim 1, wherein the connection of the connection bundles at the wire connection point with the other coil or at the coil connection point in the same coil is performed via a relay such that at least a part of the plurality of sets of the connection bundles can be switched and connected in series or in parallel by switching the relay.

4. The coil for a rotating machine according to claim 1, wherein a coil thickness of the coil is halved by displacing coils bent in opposite directions in an out-of-flux region outside a flux passage region so as not to overlap between the flux passage regions.

5. The coil for a rotating machine according to claim 1, wherein the coil is a double-wound coil in which two coils are continuously molded by winding in a spiral one electric wire for winding having a plurality of the connection bundles.

* * * * *